United States Patent Office.

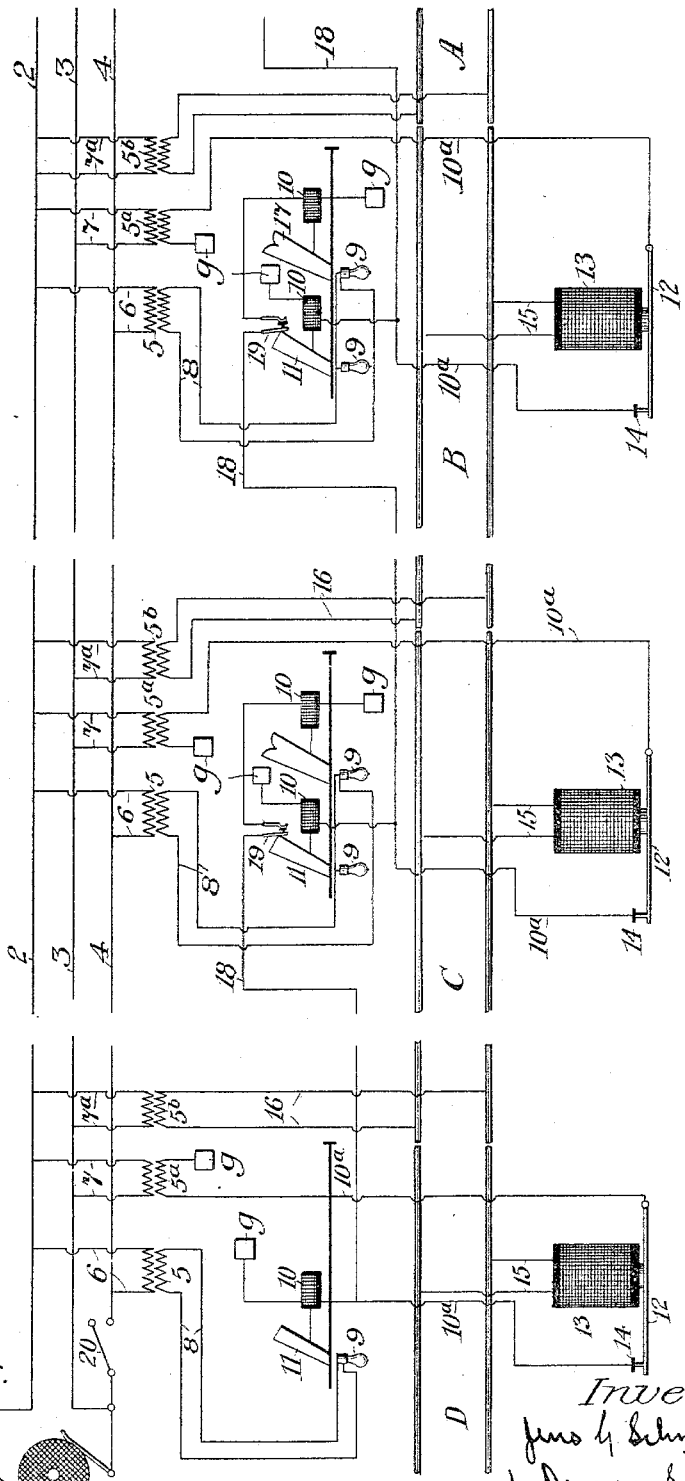

JENS G. SCHREUDER, OF WILKINSBURG, PENNSYLVANIA, ASSIGNOR TO THE UNION SWITCH AND SIGNAL COMPANY, OF SWISSVALE, PENNSYLVANIA.

ELECTRIC SWITCH AND SIGNAL APPARATUS.

SPECIFICATION forming part of Letters Patent No. 566,541, dated August 25, 1896.

Application filed March 31, 1893. Serial No. 468,560. (No model.)

*To all whom it may concern:*

Be it known that I, JENS G. SCHREUDER, a subject of the King of Sweden and Norway, residing at Wilkinsburg, in the county of Allegheny and State of Pennsylvania, have invented or discovered certain new and useful Improvements in Electric Switch and Signal Apparatus, of which improvement the following is a specification.

The invention described herein relates to certain improvements in switch and signal apparatus for railways, and has for its object the operation and control of the several parts or appliances of a railway switch and signal apparatus and the illumination of the signals by electric currents from a dynamo-electric machine located at some central point or station.

In general terms the invention consists in the combination and arrangement substantially as hereinafter described and particularly claimed.

The accompanying drawing, forming a part of this specification, is a diagrammatic view illustrating my invention as applied to the operation of signals, charging track-circuits, and the illumination of signal and other lamps.

In the practice of my invention a dynamo-electric machine 1 is located at any suitable point along the line of track to be operated, said track being divided into sections A, B, C, and D of suitable length and insulated from each other in any suitable manner. The dynamo-electric machine is constructed and operated to generate a current of such a voltage as practice has shown to effect the most economical transmission of the current to distant points, and the main conductors 2, 3, and 4 are arranged alongside of the track, preferably underground.

At each section, preferably at or near the entrance end thereof, I arrange three converters 5, 5ª, and 5ᵇ. The converter 5 is connected by wire 6 to the main conductors 2 and 4, while the converters 5ª and 5ᵇ are connected by wires 7 and 7ª to the main conductors 2 and 3. In the circuit formed by the wires 8, extending from the secondary coil of converter 5, one or more lamps 9 of the arc or incandescent type, as desired, are included, the primary and secondary coils of the converter being properly proportioned relative to the current generated and to each other to transmit the required current to the lamps.

One pole of the secondary coil of the converter 5ª is grounded, as indicated at $g$, while the other pole is connected by a wire 10ª to one pole of a long pull-magnet 10 or other suitable electrically-controlled mechanism for operating the signal 11, the other pole of the magnet 10 being grounded, as at $g'$. The circuit 10ª is formed in part by the armature 12 of the magnet 13, and so long as the magnet is excited, holding the armature 12 against the contact-point 14, also in the circuit 10ª, said circuit will remain closed and hold the signal 11 at "safety" position. The poles of the magnet 13 are connected by wires 15 to the rails of one of the insulated sections into which the main track is divided, and the opposite ends of the track-section are connected by wires 16 to the secondary coil of the converter 5ᵇ.

In order to save wire, the converters 5ᵇ may be arranged at those ends of the track-section at which the signal controlling said section and the relays controlling the signal are located—as, for example, the signal and light circuits of track-section B take their current from the converters at the entrance end of the section, while the current for the track-circuit is taken from the converter 5ᵇ at the entrance end of the track-section C, as shown in the figure.

It is preferred to employ two main conductors extending from one pole of the dynamo and to place a switch 20 in that conductor to which one pole of the primary coil of the light-converter 5 is connected, as by opening and closing the switch all the lights operated by the dynamo can be put out or lighted simultaneously without affecting the other circuits, which are connected with the other main conductors 2 and 3.

When it is desired to operate a distant signal in connection with a home signal, the former is located at or near the entrance of a section, but is controlled by a branch of the signal-circuit of the succeeding section—as, for example, the distant signals 17 shown at the entrances to the sections B and C are controlled by branch circuits 18 from the signal-circuits of sections C and D. In order to prevent confusion, circuit-breakers 19 are placed in the branch signal-circuits and are adapted to be operated by the home signals of track-sections preceding those whose condition is indicated by the distant signal. These circuit-breakers are so arranged as to be operated by said home signal when shifted to "danger" position to break the branch signal-circuits and thereby set the distant signals to "danger."

I claim herein as my invention—

In a railway signaling system, the combination of a centrally-located electric generator constructed to generate currents of sufficient potential to operate the most distant circuit of the system, a main conductor connected to one pole of generator, two main conductors connected to the other pole of the generator, a switch arranged in one of the two conductors connected to the same pole of the generator, two or more track-circuits connected to the uninterrupted main conductors, two or more signal-circuits connected to the same conductors, two or more circuits for electric lights connected to one of the uninterrupted main conductors and to the main conductor provided with a switch and converters interposed in the track, signal and light circuits, substantially as set forth.

In testimony whereof I have hereunto set my hand.

JENS G. SCHREUDER.

Witnesses:
R. H. WHITTLESEY,
DARWIN S. WOLCOTT.